United States Patent Office 2,992,797
Patented July 18, 1961

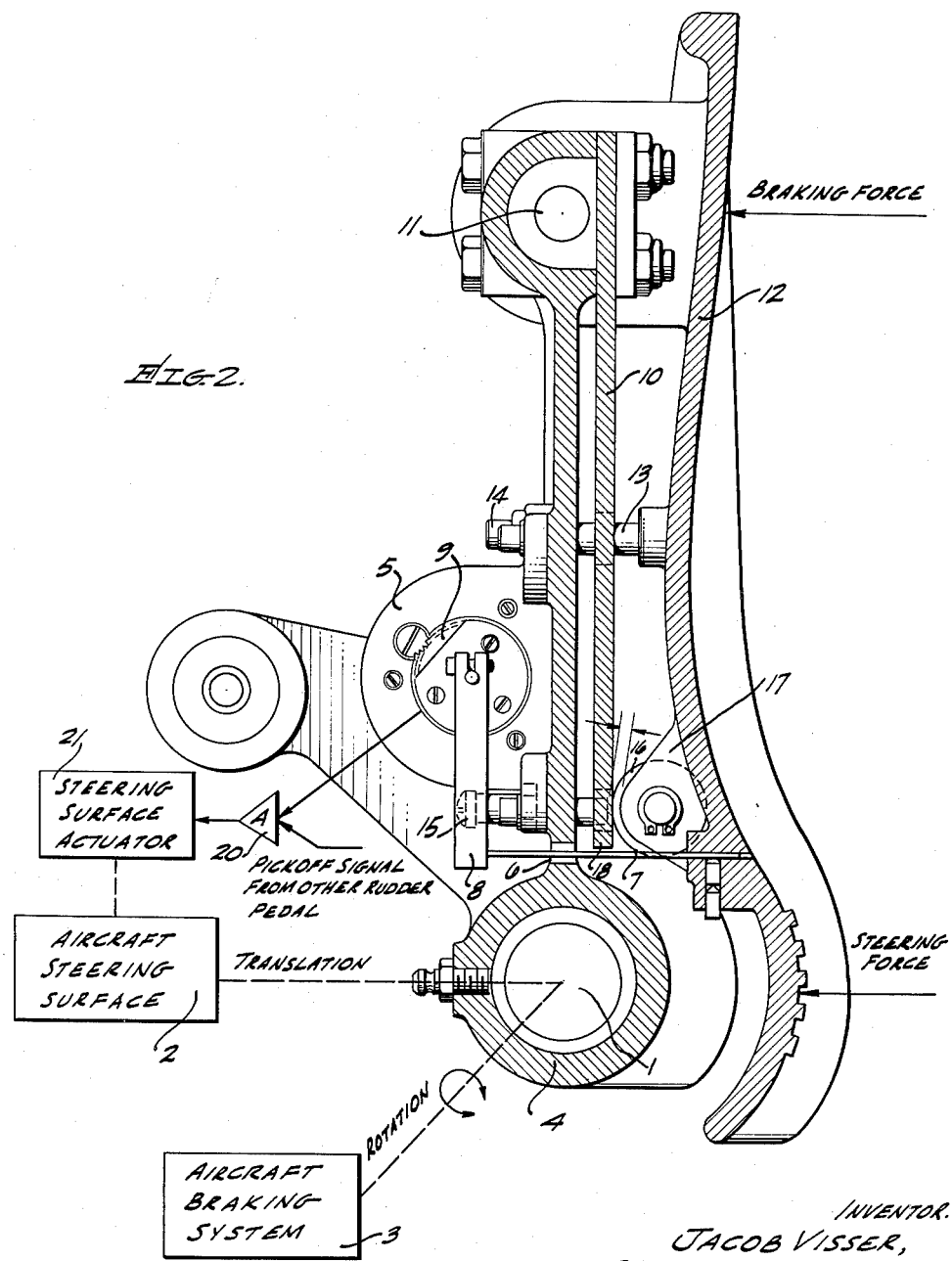

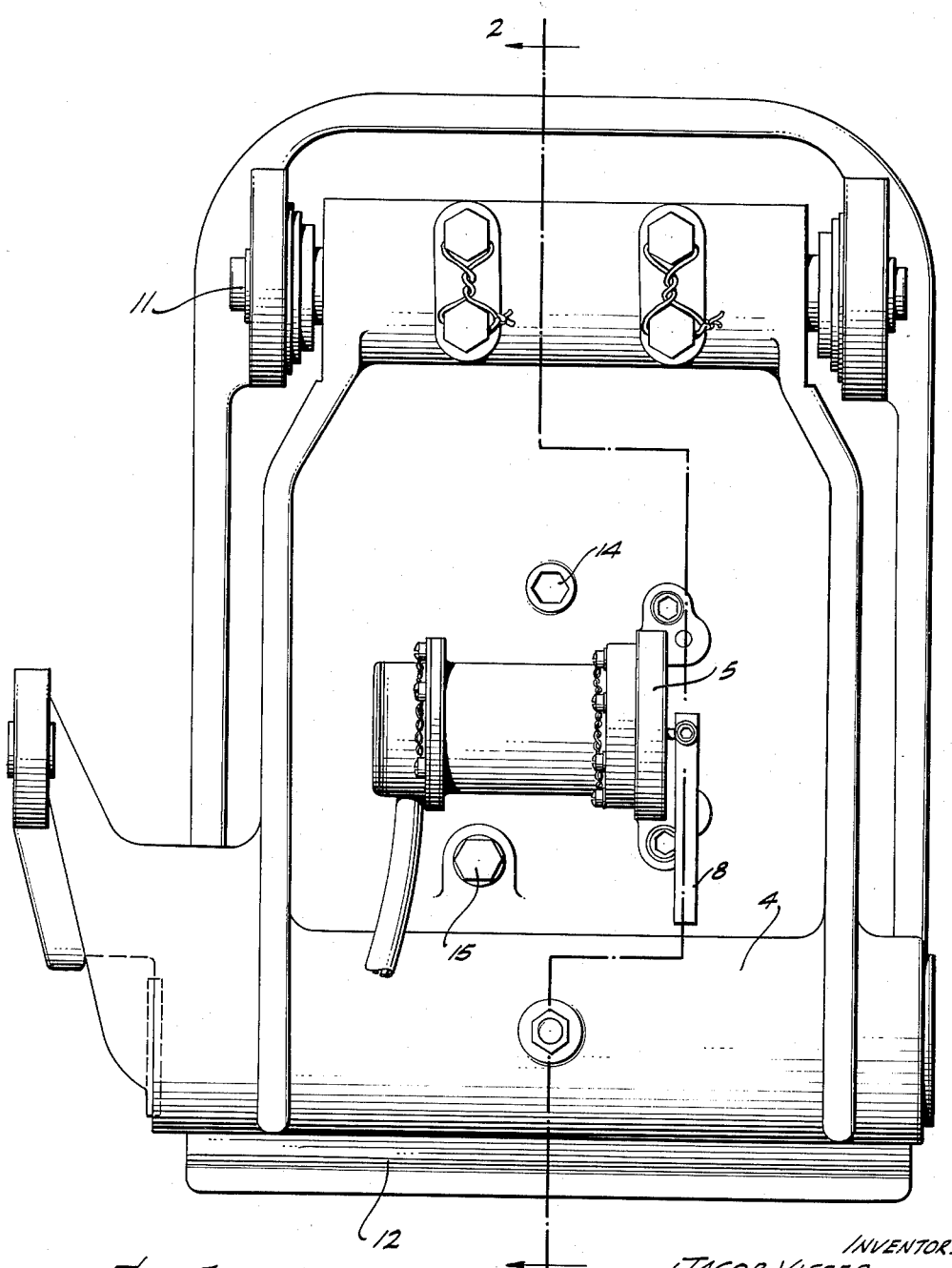

2,992,797
COMBINATION BRAKING AND STEERING
MEANS FOR AIRCRAFT
Jacob Visser, Grand Rapids, Mich., assignor to
Lear, Incorporated
Filed Sept. 30, 1957, Ser. No. 686,902
3 Claims. (Cl. 244—86)

This invention relates to an improved device for steering an aircraft and for causing braking of the aircraft when it is not airborne.

Mechanical systems for steering aircraft in the past have comprised a rudder or vertical aerodynamic steering surface and a linkage connected to foot pedals located in the cockpit of the aircraft. When these foot pedals are operated differentially, the rudder is deflected accordingly to produce a component of aerodynamic force sufficient to turn the aircraft when it is in flight. When the aircraft is on the ground, these same pedals have been connected to operate the brakes on the wheels of the landing gear of the aircraft. With the advent of modern servo-controlled aircraft it has become customary practice to utilize the mechanical foot pedal arrangement for steering the aircraft only under emergency conditions which might obtain when the autopilot malfunctions. In other words, steering of a modern, high-speed aircraft is ordinarily accomplished with a separate set of controls quite apart from the conventional mechanical controls, which latter controls, however have been retained for stand-by or emergency use.

This invention contemplates a combination of mechanical or manual controls with the servo controls which have proved their usefulness particularly in high-speed, high-performance aircraft. One of the disadvantages of the conventional servo controller is that the pilot does not retain any sense of the magnitude of the forces which the control system encounters in achieving a given maneuver commanded by the pilot. In other words, with the older style conventional manual controls, the more severe the maneuver commanded by the pilot the more force was required to be applied to the rudder pedals in order to achieve the maneuver. With the modern controls of the servo type, however, the pilot commands the maneuver without receiving any sensation of difficulty commensurate with the actual difficulty in achieving the maneuver, because the power is applied by the servo system and not by the pilot.

This invention contemplates, in addition to the combination of manual and servo controls in a single end controller, provision of means for introducing to the pilot a sensation of resistance proportional to the magnitude of the displacement commanded of the system as measured from its normal straight flight position.

It is therefore an object of this invention to provide combination braking and steering apparatus for an aircraft.

It is another object of this invention to provide combination braking and steering apparatus for an aircraft in which deflection of the controlling member up to a certain limit is resisted by a force proportional to the magnitude of the deflection commanded and the actual aerodynamic forces encountered by the control surface.

It is another object of this invention to provide an improved rudder pedal capable of controlling the servo system for steering the aircraft, controlling the braking system for the aircraft and controlling the manual steering system for the aircraft.

Other objects of the invention will become apparent from the following description taken in conjunction with the accompanying drawings, in which FIG. 1 is an elevational view of the invention;
And FIG. 2 is a section view taken at 2—2 in FIG. 1.

Conventionally a rod or similar device is rotatably mounted in an aircraft such that the axis of rotation is approximately perpendicular to the horizontal axis of the aircraft and the longitudinal axis of the shaft is perpendicular to the rotary axis of the shaft and approximately parallel with the pitch axis of the aircraft. To each end of the rod or shaft a cable or similar device is connected. The other end of the cable is connected to the moving rudder surface of the aircraft such that movement of the rod or shaft about the rotary axis hereinafter called translational motion causes the rudder surface to move a corresponding distance. The rod or shaft may be mounted at the pivot point in bearings or the like such that the rod or shaft may rotate about the longitudinal axis of the shaft with another cable connected to the rod or shaft and connected to the brake. This means then that the rod or shaft has two degrees of freedom with respect to the aircraft, the translational motion affecting the control surface and rotational motion affecting the braking system of the aircraft. Foot pedals are usually placed on the ends of the shaft. One such unique pedal will be described below although in practice two such pedals are used. Referring to the drawings, and in particular to FIG. 2, there is shown a shaft 1, translation of which is effective to operate the aircraft steering surface 2 (such a surface is exemplified by a rudder) and rotation of which is effective to operate the brakes of the landing gear of the aircraft through a braking system 3 of any type well-known in the art. Typically, as is well-known in the art, shaft 1 may be connected to the rudder cable system so that steering of the aircraft is effected by its translation while its rotation operates the braking system of the aircraft. Integrally connected to shaft 1 is a lever 4 supporting pickoff 5 and having a cylindrical hole 6 cut in it to permit free movement of pick-off rod 7 which is connected to arm 8 of movable element 9 of pickoff 5. Rigidly connected to the upper end of lever 4 is a cantilever spring 10 which extends downward in parallel relationship to lever 4 and which is deflectable about the upper end of lever 4. Lever 4 carries at its upper end a shaft 11 upon which is rotatably mounted pedal 12 which extends downward in parallel relation to lever 4, as shown. Pedal 12 is thus rotatable about shaft 11. However, the counterclockwise rotative motion of pedal 12 is limited by bolt 13 which extends through cantilever spring 10 and lever 4 in loose fitting fashion, but which is prevented from motion to the right in FIG. 2 by nut 14. Motion of pedal 12 in a clockwise direction is limited by adjustable stop bolt 15 which bears against bracket 17 which supports roller 16 on pedal 12. Notch 18 is cut in the end of cantilever spring 10 so that while roller 16 continuously bears against the end of cantilever spring 10, after a certain limited motion of pedal 12 in a clockwise direction, the end of stop bolt 15 comes in contact with bracket 17 and prevents further relative rotative movement of pedal 12 with respect to lever 4.

The end of pick-off rod 7 is similarly secured to pedal 12, as shown, so that relative rotative movement of pedal 12 about shaft 11 causes a corresponding rotative movement of pick-off element 9, which in turn produces an electrical signal which is fed to amplifier 20 connected to control steering surface actuator 21, which in turn effects motion of aircraft steering surface 2. Amplifier 20 also receives a corresponding electrical signal from a pickoff identical to pickoff 9 on the other rudder pedal (not shown). The two pickoffs' outputs are arranged to be of opposite electrical sense so that only their difference is fed to amplifier 20 and is effective to steer the aircraft.

In operation, when the aircraft is on the ground, the pilot utilizes pedal 12 for braking by applying a horizontal force on a line of action approximately intersecting shaft 11. This is ordinarily accomplished by the pilot's toes, and selective braking action may be obtained. However, ordinarily braking force is applied to both pedals of the system simultaneously so that braking by each wheel of the aircraft is at least roughly equivalent. By the application of force on a line of action intersecting shaft 11, rotation of shaft 1 is caused, with the effect that the aircraft braking system is actuated. If the forces thus applied to the two pedals are approximately equal, little if any deflection of the control system will be accomplished. From FIG. 2 it is clear that pedal 12 is not rotated about shaft 11 by application of force along line of action intersecting shaft 11 and, therefore, no pick-off signal is generated which would be effective in causing actuation of steering surface actuator 21. If the line of action of the braking force lies above shaft 11 there is still no deflection of pickoff 5, because bolt 13 prevents counterclockwise rotation of pedal 12.

When the aircraft is airborne, steering of the aircraft is ordinarily accomplished by the application of a steering force along a line of action substantially intersecting the axis of shaft 1. When a light force is applied to one rudder pedal or the other at the lower extremities thereof, rotation of the pedal occurs about shaft 11. This rotation results in a clockwise motion of pick-off element 9 and the generation of an electrical signal proportional to the pickoff displacement which is fed to amplifier 20. As previously noted, the electrical hookup is made so that only the difference in signals from both pedals is fed to the amplifier and utilized to effect deflection of steering surface actuator 21, which in turn controls the position of the aircraft rudder.

If a hard-over signal is commanded, i.e., if the pilot applies a very great force to the lower end of the pedal, pedal 12 immediately strikes the end of stop bolt 15, after which the entire force supplied by the pilot is transmitted through the conventional mechanical linkage to the aircraft steering surface. During this operation, however, the pickoff is deflected and a full command signal is being supplied to amplifier 20 to cause the servo-driven response of the aircraft steering surface in the same sense as required by the mechanical translation of shaft 1. If a force less than sufficient to cause pedal 12 to come in contact with stop bolt 15 is applied, it will be noted that cantilever spring 10 deflects. However, cantilever spring 10 is not mounted externally of the pedal to provide a fixed relationship between the force applied and the deflection, but, rather a fixed relation between the reactive force of the aircraft steering surface as transmitted back through the mechanical linkage between the aircraft steering surface and shaft 1 and the force applied. In other words, since cantilever spring 10 is mounted on the rudder pedal assembly, which in turn is supported against translational movement by shaft 1, any horizontal reaction supplied by cantilever spring 10 must be in proportion to the resistive force of the mechanical control system. Thus, if the aircraft is flying at very high altitude and at moderate speed, the control surfaces, including the rudder, would be relatively easily deflectable. Accordingly, if a one-pound force is applied to the lower extremity of pedal 12, a one-pound reactive force is supplied by cantilever 10 and this reactive force is finally applied to shaft 1 so that a one-pound force is applied to the mechanical steering system aside from the fact that because of the deflection of the pedal, the pickoff is deflected and immediately a servo-powered force is also applied to the control surface. Note that since the shaft 1 is mechanically connected to the control surface by way of the servo, the shaft 1 will move as the control surface is moved by the servo, thereby offering little resistance to the force supplied to the pedal.

Now, with the same aircraft at lower altitude and a higher speed, the steering surface would be harder to deflect, i.e., the aerodynamic forces on the surface when it is deflected would be higher than at higher altitude and at lower speed. Then a one-pound force applied to the lower extremity of the pedal would have a much less direct effect through the mechanical linkage of the control system, because a much greater force is required to steer the aircraft at lower altitude and higher speed. The servo response, however, would be the same as in the first case discussed, but the apparent resistance of the pedal to the pilot's force would be somewhat greater than in the first case because of a greater tendency of the mechanical control system to resist deflection. Thus, it is clear that the resistive force, or feel, of the system to the pilot becomes a function to some extent of the aerodynamic forces to be overcome in causing a given maneuver commanded by the pilot. To avoid overloading of the aircraft this sensation is quite valuable. In general, the resistive force to a pilot's command is proportional both to the deflection commanded and to the aerodynamic forces on the aircraft steering surface tending to resist motion thereof.

Another advantage of the system of this invention stems from the fact that in modern aircraft, major course changes are ordinarily accomplished without the use of the rudder pedals but are initiated by use of the control stick and ailerons. Thus, the aircraft is banked and then the rudder is deflected the proper amount to prevent sideslip. When the pilot is in the course of landing with a conventional autopilot engaged, he is powerless to skid the aircraft for small path corrections because if he commands a turn, the aircraft will bank. Likewise, if the aircraft is in a strafing run and the pilot wishes to give a lateral scatter to his gun coverage he cannot change the yaw attitude of the airplane without also banking. With this invention, however, in both the above examples, the pilot may deflect the rudder to cause skid and consequent change in yaw attitude of the aircraft without disengaging the autopilot. Thus, the pilot can give a lateral spread to his gun coverage simply by momentarily deflecting the rudder. Likewise, in making a landing approach, he can leave the autopilot engaged and supply corrections as needed by use of the rudder pedals, for example, to center his flight course on the runway.

Although the invention has been described and illustrated in detail it is to be clearly understood that the same is by way of illustration and example only and is not to be taken by way of limitation, the spirit and scope of this invention being limited only by the terms of the appended claims.

I claim:

1. In combination an aircraft having braking means and steering means, a shaft mounted on said aircraft having translational and rotational freedom, said shaft connected to said braking means and said steering means to cause braking of said aircraft by its rotation and steering of said aircraft by its translation, a lever connected to said shaft and extended upward therefrom, a pedal hingedly connected to the upper end of said lever and extending downward near said shaft, means permitting limited rotary motion of said pedal about the free end of said lever, pick-off means generating an electrical signal proportional to said rotary motion of said pedal and servo means for steering said aircraft in response to the output of said pick-off means, said shaft being moved by said servo means and force applied to the upper portion of said pedal is effective in causing said shaft to rotate thereby braking said aircraft, and force supplied to the lower portion of said pedal is effective in causing rotational movement of said pedal about said free end of said lever and operation of said servo means thereby steering said aircraft, said means permitting limited rotary motion of said pedal comprising spring means opposing motion of said pedal and a stop limiting motion of said spring, whereby the output of said pick-off means is substantially proportional to force supplied to said pedal for small motion thereof, and further force supplied to said pedal is applied directly to said shaft to thereby move said shaft and steer said aircraft.

2. A device as claimed in claim 1, wherein said lever, said pedal, and said pick-off means are located at one end of said shaft and further comprising a second pick-off means, second lever and second pedal located at the other end of said shaft, said second pick-off means, said second lever and said second pedal functioning the same as said first mentioned pick-off means, lever, and pedal but operating in an opposite sense where the translational motion of said shaft and steering of said aircraft is concerned.

3. In combination, an aircraft having braking means and steering means, a shaft mounted on said aircraft having translational freedom about an axis approximately parallel to the yaw axis of said aircraft and rotational freedom about an axis approximately parallel to the pitch axis of said aircraft, said shaft connected to said braking means and said steering means to cause braking of said aircraft by its rotation and steering of said aircraft by its translation, a first and second lever connected to the respective ends of said shaft and extending upward therefrom, a first and second pedal hingedly connected to the upper ends of said first and second lever respectively and extending downward near said shaft, means permitting limited rotary motion of said first and second pedal about the free ends of said lever, first and second pick-off means mounted on said lever generating an electrical signal proportional to said rotary motion of said first and second pedals respectively about the free ends of said lever, and servo means for steering said aircraft in response to the difference of the electrical output of said pick-off means, said shaft being moved by said servo means and force supplied to the upper portion of said pedal is effective in causing said shaft to rotate thereby braking said aircraft and wherein force supplied to the lower portion of said first and second pedals is effective in causing rotational motion of said first and second pedals about said free ends of said lever, and operation of said servo means in response to the difference in magnitude of signal emitted by said first and second pick-off thereby steering said aircraft, said means permitting limited rotary motion of said first and second pedals comprising resilient means opposing motion of said pedal and a stop means limiting motion of said resilient means whereby the output of said pick-off means is substantially proportional to force supplied to said pedals for small motions thereof, and further force supplied to the lower portions of said first and second pedals is applied directly to said shaft to thereby move said shaft and steer said aircraft.

References Cited in the file of this patent

UNITED STATES PATENTS

| | | |
|---|---|---|
| 2,337,706 | Berry | Dec. 28, 1943 |
| 2,445,900 | Wisman | July 27, 1948 |
| 2,451,263 | Webb | Oct. 12, 1948 |
| 2,583,828 | Gerstenberger | Jan. 28, 1952 |
| 2,590,029 | Minorsky | Mar. 18, 1952 |
| 2,861,756 | Feucht et al. | Nov. 25, 1958 |
| 2,865,337 | Dennis et al. | Dec. 23, 1958 |